(12) United States Patent
Zimmer

(10) Patent No.: US 7,036,181 B2
(45) Date of Patent: May 2, 2006

(54) FIXING PIECE FOR A WINDSCREEN WIPER

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 10/110,246

(22) PCT Filed: Jul. 11, 2001

(86) PCT No.: PCT/DE01/02593

§ 371 (c)(1),
(2), (4) Date: Aug. 9, 2002

(87) PCT Pub. No.: WO02/12034

PCT Pub. Date: Feb. 14, 2002

(65) Prior Publication Data
US 2003/0028992 A1 Feb. 13, 2003

(30) Foreign Application Priority Data
Aug. 10, 2000 (DE) ................. 100 39 053

(51) Int. Cl.
B60S 1/34 (2006.01)

(52) U.S. Cl. .................... 15/250.351; 15/250.352; 15/250.34; 29/897.2; 72/347

(58) Field of Classification Search ........... 15/250.351, 15/250.352, 250.34; 29/897.2
See application file for complete search history.

(56) References Cited

U.S. PATENT DOCUMENTS

| 2,832,982 A | * | 5/1958 | Parkes | ...................... 15/250.34 |
| 4,502,178 A | | 3/1985 | Ragot et al. | |
| 4,765,017 A | * | 8/1988 | Berger et al. | .......... 15/250.002 |
| 4,991,251 A | * | 2/1991 | Egner-Walter et al. | 15/250.202 |
| 6,094,772 A | * | 8/2000 | West | ....................... 15/250.04 |
| 6,327,739 B1 | * | 12/2001 | Kotlarski | ............... 15/250.351 |
| 6,505,377 B1 | * | 1/2003 | Merkel et al. | .......... 15/250.351 |
| 6,511,254 B1 | * | 1/2003 | Zimmer | ..................... 403/365 |
| 2002/0112308 A1 | * | 8/2002 | Zimmer et al. | ........ 15/250.352 |
| 2003/0005541 A1 | * | 1/2003 | Merkel et al. | .......... 15/250.351 |
| 2003/0110587 A1 | * | 6/2003 | Ritt | ....................... 15/250.352 |
| 2004/0216261 A1 | * | 11/2004 | Ritt | ....................... 15/250.351 |

FOREIGN PATENT DOCUMENTS

| DE | 35 15 329 | 12/1985 |
| DE | 43 31 602 | 3/1995 |
| DE | 196 15 868 | 10/1997 |
| EP | 0579550 | * 1/1994 |
| EP | 0 798 184 | 10/1997 |
| FR | 2 550 147 | 2/1985 |
| WO | 93/19956 | 10/1993 |

* cited by examiner

Primary Examiner—Gary K. Graham
(74) Attorney, Agent, or Firm—Kenyon & Kenyon

(57) ABSTRACT

A mounting part of a windshield wiper, having a receiving opening for a wiper shaft at one end, and forming a part of a fold-away hinge at the other end, and being formed from a flat sheet metal by deep-drawing, punching and bending and having a u-shaped cross-section profile and a spring mount. The spring mount is formed by deep-drawing from a sidewall of the u-shaped cross-section profile.

10 Claims, 3 Drawing Sheets

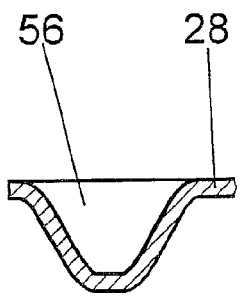
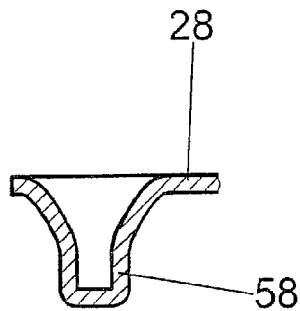
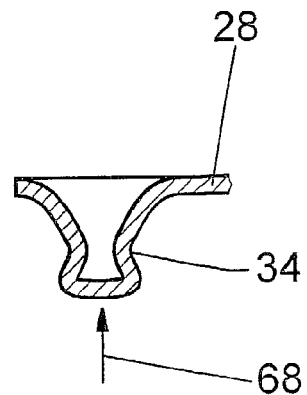
Fig. 3　　　　Fig. 4　　　　Fig. 5
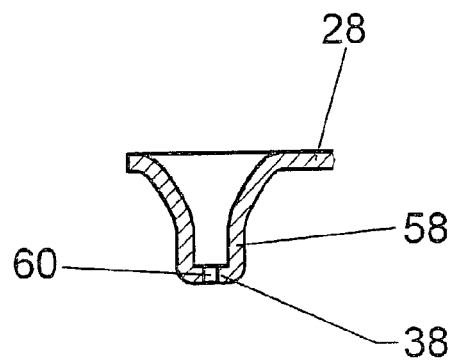
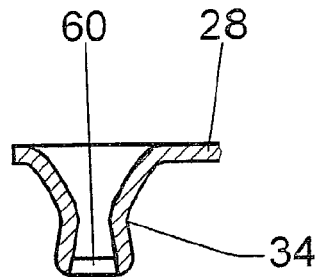
Fig. 6　　　　Fig. 7

FIXING PIECE FOR A WINDSCREEN WIPER

BACKGROUND INFORMATION

Known windshield wipers have a wiper arm, which is made up of a driven mounting part and a hinge member that is connected to it by a hinged joint and has a wiper rod. A wiper blade is pivoted at the free end of the wiper rod. The wiper blade is guided across the vehicle windshield during the swivel motion of the windshield wiper, an extension spring prestressing the fold-away hinge, so that the wiper blade is pulled toward the vehicle windshield.

The extension spring is accommodated in the u-shaped cross-section profile of the articulated part and is suspended on the articulated part by one end using a cross-pin. By its other end, the extension spring is attached to a spring mount on the mounting part, via a c-shaped clip. In known mounting parts, this spring mount is either preformed or formed by a rivet pin. In one variant, for instance, mounting parts, designed as sheet metal form parts, use a pin as spring mount. During manufacture, this is pressed into holes in the sidewalls of the u-shaped cross-section profile of the mounting part, and then riveted. In contrast to a one-piece mounting part, this requires additional production time for the installation and production of the additional components.

The spring mount is exposed to relatively high forces by the extension spring. In the working position, or fold-away position, these forces also come to bear from different directions, with a 90° difference, for example, resulting in a relative movement between the extension spring or the c-shaped clip and their mountings. To achieve sufficiently high strength, the mounting pin at the mounting part is usually made from a different material than the sheet metal bent component. However, when joining different materials, the danger of contact corrosion exists in the interconnecting region.

In addition to a part of the fold-away hinge and a spring mount, the mounting part also has a mounting region on the opposite end by which the wiper arm is rigidly, but detachably connected to a wiper shaft. The mounting region is designed as a shaft-hub-connection and is formed by a receiving opening having an inner cone, into which the free end of the wiper shaft, which is provided with an appropriate outer cone, projects. The two parts are braced by a screw nut. There are also known variants in which the conical interconnecting region is located between a collar of the screw nut and the receiving opening of the mounting part. The form of the receiving opening is created in different ways. If the mounting part is made of a die cast metal or plastic, the receiving opening is usually formed during the die-casting or injection molding, whereas it is produced in several drawing steps if sheet metal bent components are involved.

SUMMARY OF THE INVENTION

In accordance with the present invention, the spring mount of a mounting part designed as a sheet metal bent component is formed from a sidewall of the u-shaped cross-section profile by deep-drawing. Thus, the sheet metal form part is designed as one piece and includes all the essential functional elements, such as a receiving opening for a wiper shaft, a part of a fold-away hinge and a spring mount for an extension spring. In order to avoid subsequent assembly steps, as many functions as possible are integrated in one component, which reduces production time and cost.

Furthermore, there is no contact corrosion in a one-piece mounting part, since there are no critical connecting regions, at riveting pins, for instance.

For better bracing or introduction of the spring forces in the sidewall of the u-profile, the deep-drawn spring mount has a conical shape that widens in the direction of the sidewall. As a result, the spring mount has a sturdy design, resulting in minimal elastic deformation in response to forces, and, in this manner, minimizing, or entirely eliminating, the effect on the application force of the wiper blade.

The spring mount has a round cross-section. It may also be oval, in which case it is expedient for the larger diameter to point in the direction of the force of the extension spring when the wiper arm is in the working position. The cross-section of the spring mount narrows from the sidewall to a necking, and then widens again from that point to the free end. Furthermore, the necking contour is adapted to the cross-section contour of a c-shaped retaining clip, so that the extension spring is securely fastened and will not slide off the mounting in response to vibrations. A lateral stop is required to anchor the extension spring. This is created in a simple manner by compressing the free end of the spring mount or, in a variant of the present invention, by punching and subsequent widening of the end region.

In order to reduce the friction between the spring mount and the c-shaped clip and thereby the wear resulting from the slight rotation of the c-clip during operation, the necking region is expediently provided with a coating of a bearing material, such as plastic, or an additional plastic ring. In this manner, the wiper arm can be folded back from the vehicle windshield more easily. The spring mount is preferably deep-drawn from only one sidewall of the u-profile and projects into the u-shaped cross-section profile, up to its center region. In this manner, a clearance is created adjacent to the spring mount, in which, for instance, the tube leading to the water supply of a windshield washer system could be accommodated. Due to the deep-drawn spring mount, a visible insertion point is present on the side of the mounting part, located in a region that is either covered by the articulated part or possibly by a protective cover. In this context, it is advantageous if the spring mount originates from a downward-pointing sidewall of the mounting part, for instance pointing towards the vehicle hood, in order to prevent dirt and water from accumulating in the hollow space of the spring mount which is open to the outside.

In accordance with the present invention, the spring mount is produced in several drawing steps. The material is first drawn in over a large area, so that a uniform wall thickness across all regions is achieved. The conical region is then formed in several steps and a cylindrical region at the closed end, as well as the end piece formed as a stop. Since the receiving opening for the wiper shaft is deep-drawn like the spring mount, both regions may be produced using one tool, in particular since the production of both regions requires approximately the same number of drawing steps (approx. 5 to 7). While this may slightly increase the cost of the deep-drawing equipment, the machining time will not be increased. In this manner, a cost-effective component is created by producing the two strongly deformed areas of the mounting part with a comparatively low investment in tool manufacture.

The receiving opening and the spring mount are best produced in one phase in the still flat metal strip. The characteristic u-profile of the mounting part is then produced by bending the sidewalls. After this reforming process, the spring mount will be located on a sidewall and the receiving opening for the shaft-hub-connection in the top wall. If

BRIEF DESCRIPTION OF THE DRAWINGS

FIGS. 3–5 shows a part-sectional view of a flat metal part in the region of the spring mount, during different production phases.

FIGS. 6–7 show variants of FIG. 5.

DETAILED DESCRIPTION

Figure 1:
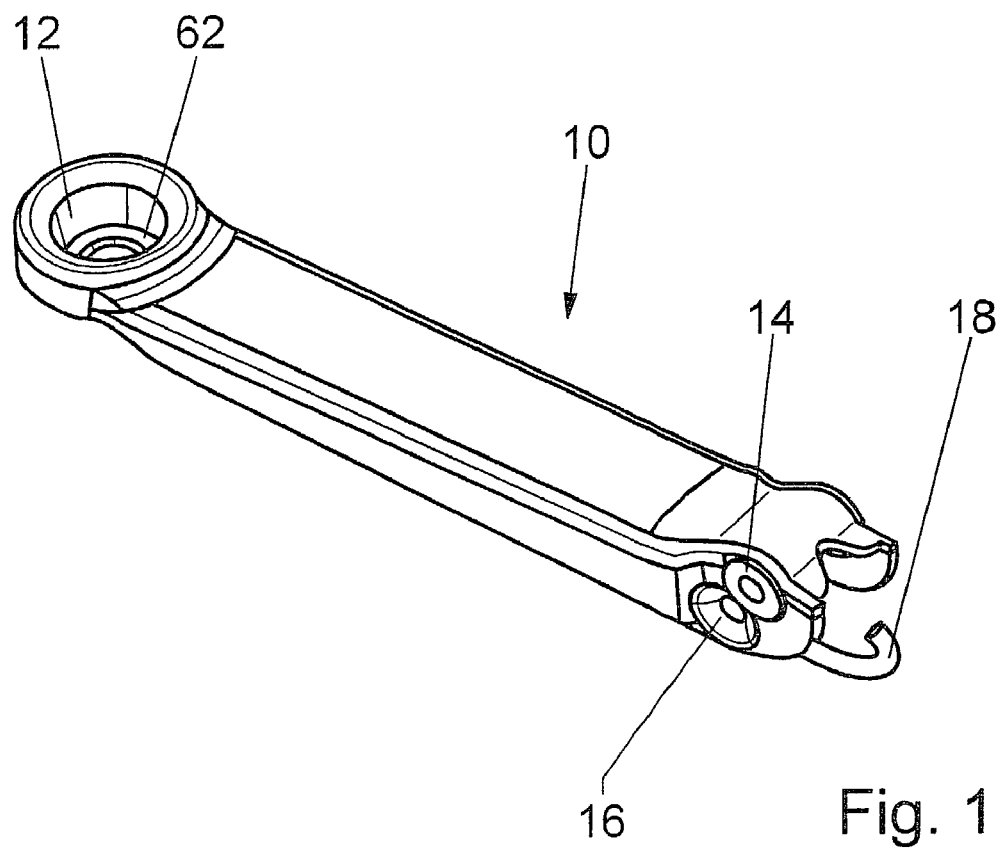
FIG. 1 shows a perspective representation of a mounting part, in top view.
Figure 2:
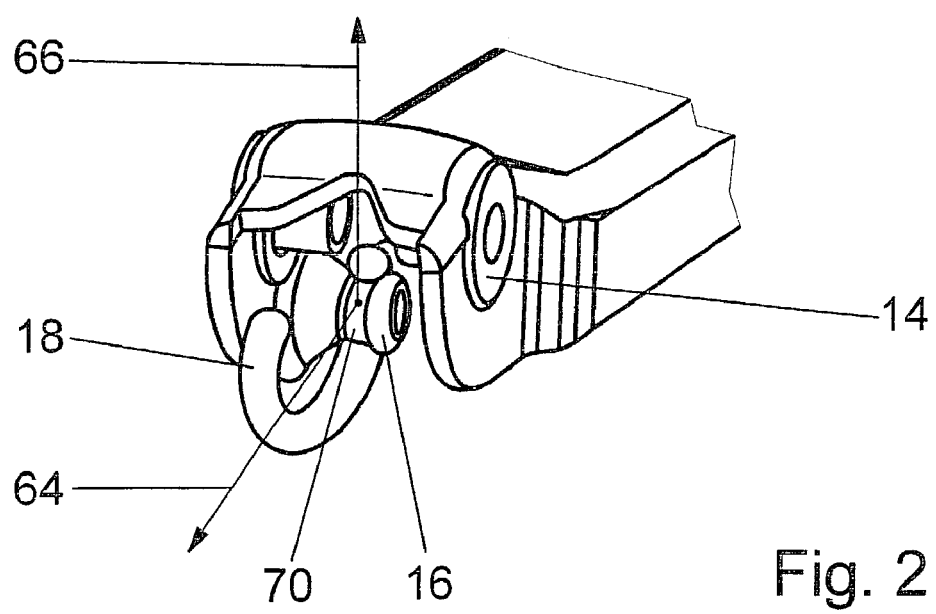
FIG. 2 one end of the mounting part having a spring mount, enlarged from a different perspective.

A mounting part 10 of a windshield wiper is provided at one end with a receiving opening 12 or 46 for a wiper shaft 44 (FIG. 10) and forms part 14 of a fold-away hinge at the other end (FIG. 1). Mounting part 10 also has a preformed spring mount 16 at this end, in which a c-shaped clip 18 of an extension spring (not shown) engages. Spring mount 16 is formed from a sidewall 24 of the u-shaped cross-section profile 20 by deep-drawing (FIGS. 2 and 9).

Relatively large tensile forces 64 and 66, respectively, are exerted on spring mount 16 from various directions, via c-shaped clip 18. The cross-section of spring mount 16 has a correspondingly sturdy design, by having a round hollow section which has the largest cross-section in the area transitioning to sidewall 24, and tapers to a necking 34. Necking 34 forms the engagement area of c-shaped clip 18 and, therefore, has a contour 36 which is adapted to the cross-section contour of c-shaped clip 18. The cross-section of spring mount 16 increases again from necking 34 to the free end, so that a secure seat of c-shaped clip 18 is assured. This is of special importance, since c-shaped clip 18 executes a relative movement with respect to spring mount 16 during the fold-away procedure. In order to reduce the friction between c-shaped clip 18 and spring mount 16, the area of necking 34 is best coated with a bearing material or surrounded by a ring made of plastic 70.

Spring mount 16 is deep-drawn during a phase when sheet 28 is still flat. In this context, spherical indentation 56 is first formed by material being drawn in over a large area (FIG. 3). A cylindrical part 58 is then formed in several steps (FIG. 4). This is compressed in lateral direction 68 by an appropriate tool, thus creating necking 34 (FIG. 5). In an exemplary embodiment of the present invention, necking 34 is created by punching an opening 60 in the front-side base 38 of cylindrical part 58, which is widened in a subsequent step (FIGS. 6 and 7).

Figure 8:
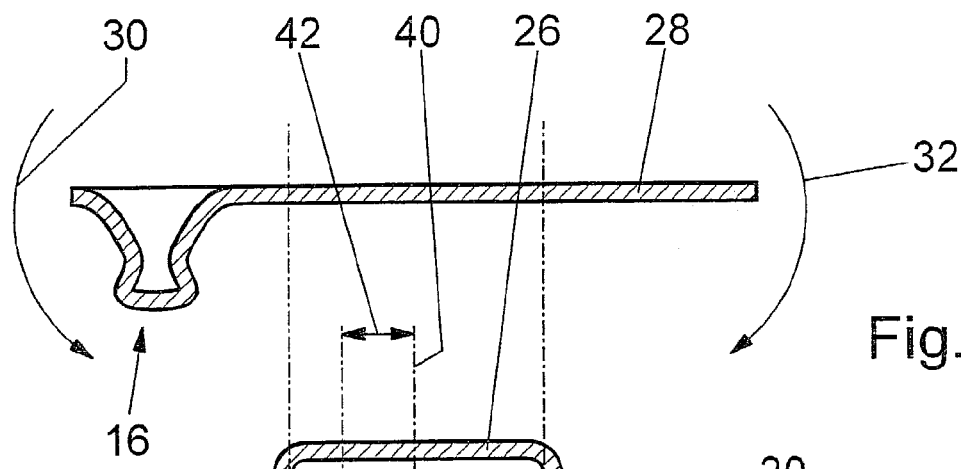
FIG. 8 shows a cross-section through a mounting part in the region of the spring mount, before bending of the sidewalls.
Figure 9:
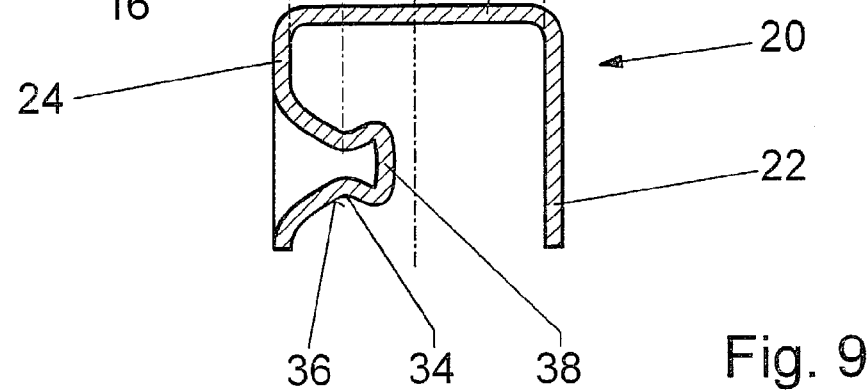
FIG. 9 shows a cross-section through a mounting part in the region of the spring mount, after bending of the sidewalls.

After forming spring mount 16, the parts of sidewalls 22 and 24 are bent in arrow direction 30 and 32, respectively, relative to the part of top wall 26, u-shaped cross-section profile 20 being formed from flat sheet 28 (FIGS. 8 and 9). Spring mount 16 will then be located on sidewall 24 and project with its free end into u-shaped cross-section profile 20. Necking 34 has a clearance 42 with respect to profile center 40 for laterally fixating the extension spring. This clearance is produced after bending in an additional calibration step.

Figure 10:
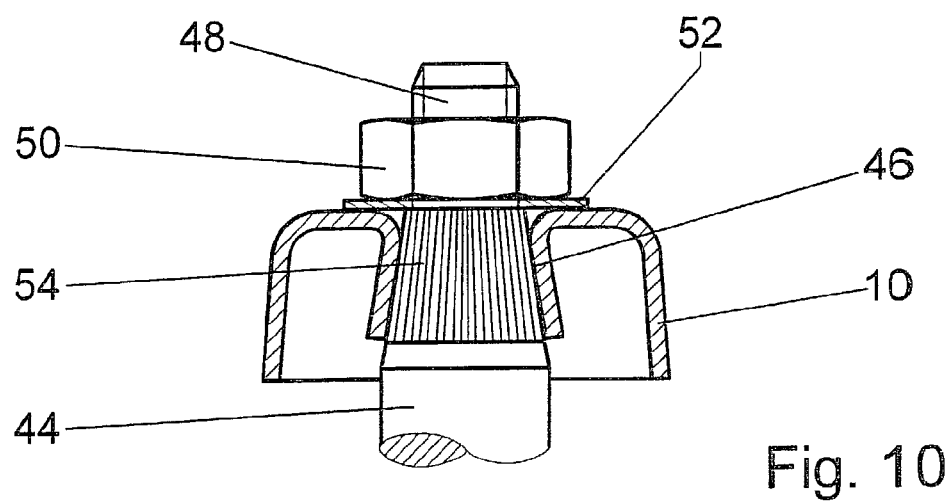
FIG. 10 shows a section through a receiving opening of the mounting part.

Located on top wall 26 of u-shaped cross-section profile 20 is receiving opening 12. It has a conical shape, which projects into u-shaped cross-section profile 20 of mounting part 10 and tapers from top wall 26 to a collar 62. FIG. 10 shows the mounting region of mounting part 10, a receiving opening 46 being shown as a variant. A wiper shaft 44 is provided with cone 54 at its free end, which fits into conical receiving opening 46. Mounting part 10 and wiper shaft 44 are fixedly, but detachably interconnected, by screwing screw nut 50 onto a threaded stud 48. For additional safeguarding of the firm connection, cone 54 is provided with knurling, and a disk 52 is positioned between mounting part 10 and screw nut 50. Receiving opening 12 or 46 is best produced by deep-drawing. In accordance with the present invention, spring mount 16 is also deep-drawn on mounting part 10, and both deep-drawn regions are produced on flat sheet 28 in one phase.

What is claimed is:

1. A mounting part of a windshield wiper, the mounting part having a first end and a second end, the mounting part being produced from a flat sheet metal by deep-drawing, punching and bending, the mounting part having a u-shaped cross-section profile, the mounting part comprising:
   a receiving opening for a wiper shaft at the first end;
   a part of a hinged joint at the second end; and
   a spring mount formed by a deep-drawing from a sidewall of the u-shaped cross-section profile, wherein a cross-section of the spring mount tapers from the sidewall to a necking, and increases in cross-section from the necking to a free end.

2. The mounting part according to claim 1, wherein a contour of the necking is adapted to a cross-section contour of a c-shaped clip.

3. The mounting part according to claim 1, wherein a front-side base of the spring mount has an opening at the free end of the spring mount.

4. The mounting part according to claim 1, wherein the receiving opening widens conically towards a top wall of the u-shaped cross-section profile and, at an end pointing to a center of the receiving opening into the mounting part, has a collar.

5. The mounting part according to claim 1, wherein the receiving opening tapers conically towards a top wall.

6. The mounting part according to claim 1, wherein the spring mount is one of (a) coated with a bearing material and (b) surrounded by a ring of plastic in a region where a c-shaped clip engages.

7. A method of producing a mounting part as recited in claim 1, comprising:
   forming a spring mount initially in a flat sheet metal by deep drawing; and
   subsequently bending parts of sidewalls of the mounting part relative to a part of a top wall of the mounting part.

8. The method according to claim 7, further comprising producing a necking of the spring mount by compression of the spring mount in a longitudinal direction.

9. The method according to claim 7, wherein a necking is produced by widening an opening in a base of the spring mount.

10. The method according to claim 7, further comprising producing a receiving opening simultaneously with the spring mount, prior to bending the sidewalls.

* * * * *